June 17, 1958  L. C. MEADE  2,838,979
REAR VISION MIRROR
Filed Nov. 26, 1954  2 Sheets-Sheet 1
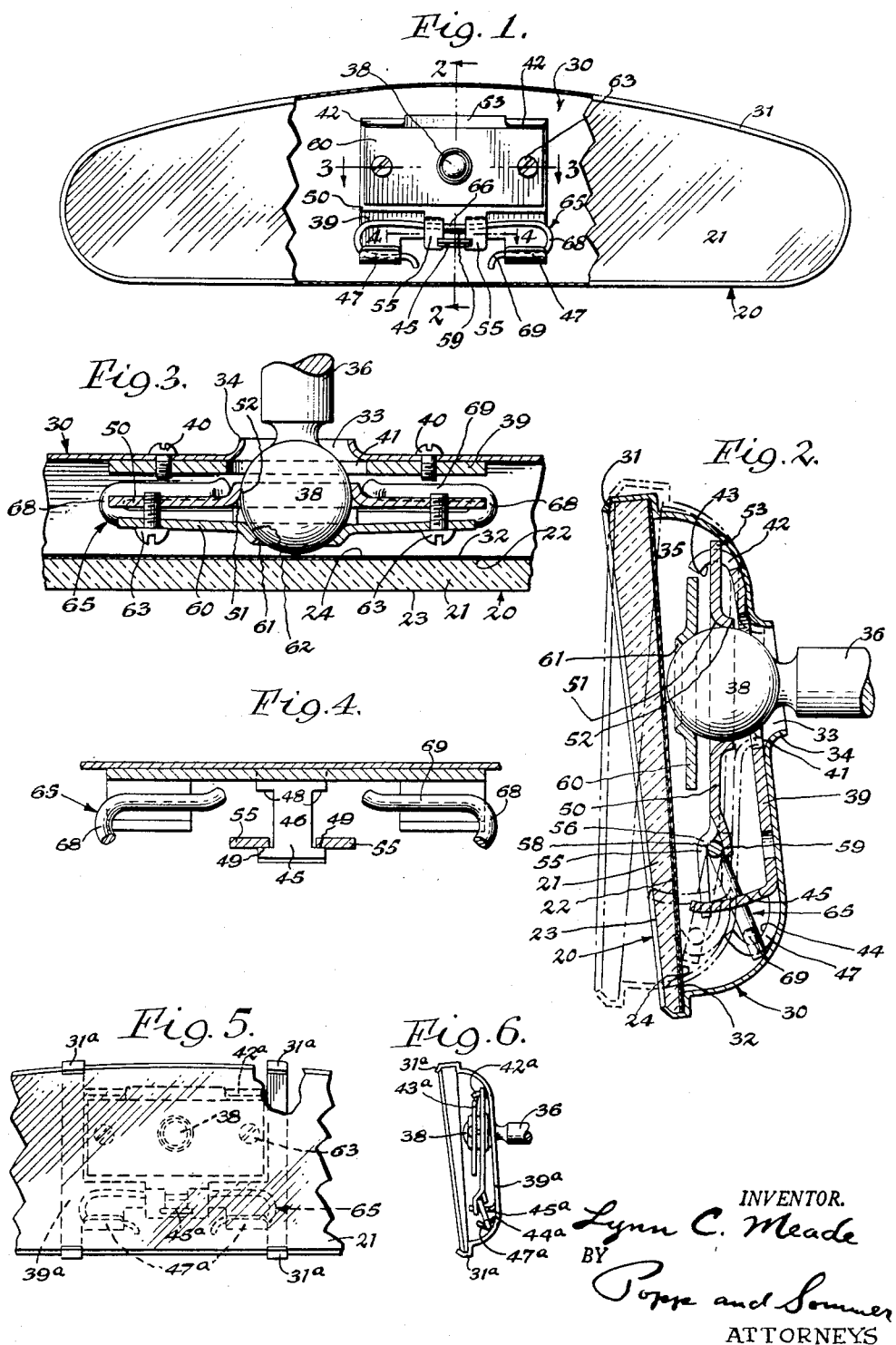
INVENTOR.
Lynn C. Meade
BY
Pope and Sommer
ATTORNEYS June 17, 1958 L. C. MEADE 2,838,979
REAR VISION MIRROR
Filed Nov. 26, 1954 2 Sheets-Sheet 2
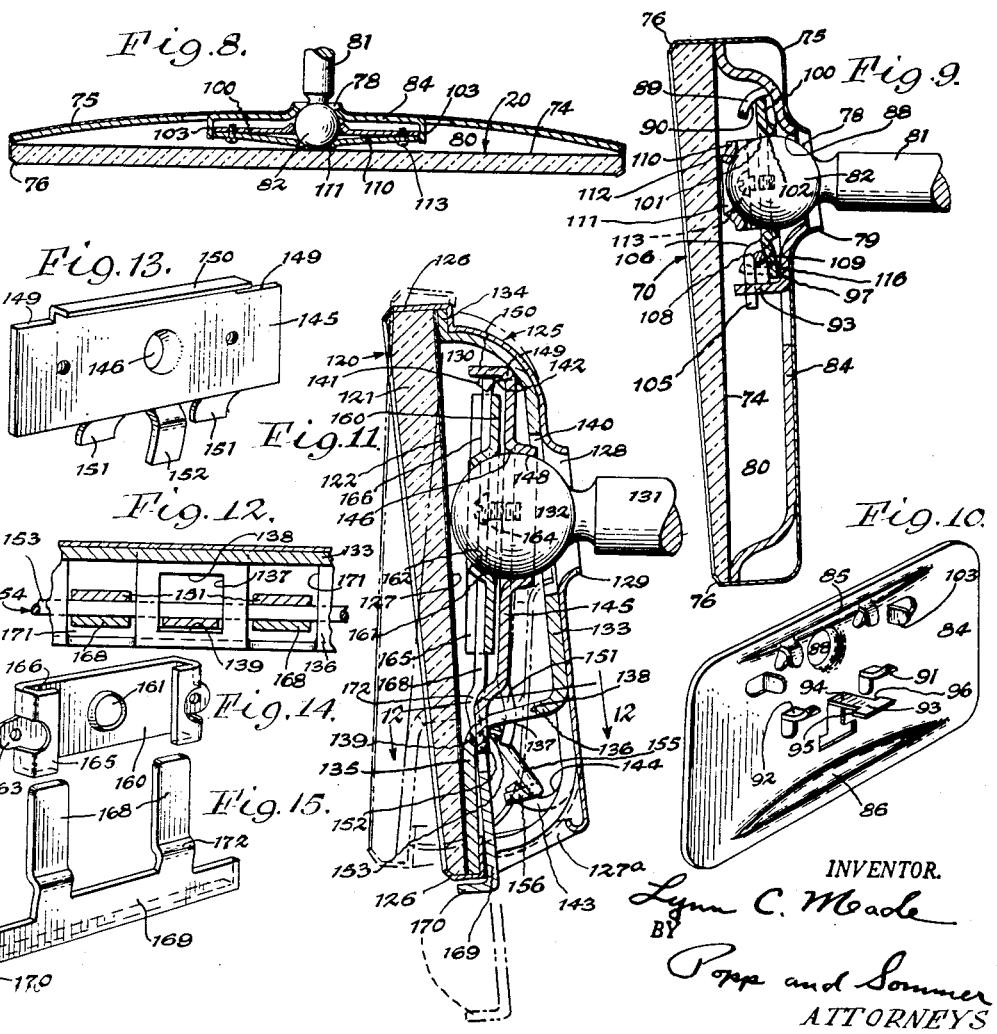

United States Patent Office 2,838,979
Patented June 17, 1958

2,838,979

REAR VISION MIRROR

Lynn C. Meade, Buffalo, N. Y., assignor, by mesne assignments, to Standard Mirror Company, Inc., Buffalo, N. Y., a corporation of New York Application November 26, 1954, Serial No. 471,373

4 Claims. (Cl. 88—77)

This invention relates to a mounting for a glare-reducing rear vision mirror and more particularly to such a mounting for a rear vision mirror adapted for both night and day driving wherein the brightness of images or light from headlights or sun can be reduced in intensity from the normal maximum.

The invention is particularly shown as embodied in a rear vision mirror having a single prismoidal mirror as shown in the La Hodny and Bertell Patent No. 2,325,615 granted August 3, 1943, for Mounting for Rear Vision Mirrors where the high intensity image is reflected from the metallic reflective coating on the back of a prismoidal glass panel and the low intensity image is reflected from the front face of the prismoidal glass panel. It is also possible to employ, with two transparent panels arranged at an angle to each other and one provided with a primary reflective coating a series of images of reduced intensity by selecting, as disclosed in Shertz No. 2,455,818 granted December 7, 1948, images which have been subjected to different numbers of cross reflections between the primary reflective surface and the companion transparent plate. In all cases, the different images are selected by adjusting the vertical angularity of the prismoidal mirror or array of transparent panels about an axis generally parallel with both of the reflective surfaces to obtain images of the desired intensity.

One of the principal objects of the invention is to provide such a rear vision mirror in which the entire adjusting mechanism for adjustably supporting the prismoidal mirror panel or array of angularly disposed glass plates is substantially completely concealed within a mirror case the edges of which are turned over to form a bezel for the mirror panel. By this arrangement, the mechanism for holding the mirror panel in and permitting its adjustment to different positions is concealed from view and the mirror has substantially the appearance of a normal single reflective rear vision mirror. Also concealed is the mechanism for adjusting the mirror panel to reflect the desired view into the eyes of the driver.

Another important object of the invention is to provide such a rear vision mirror in which there is no excessive or unsightly bulging of the mirror case to accommodate mechanism contained therein.

Another aim is to provide such a rear vision mirror in which the properly positioned mirror panel can be quickly and positively adjusted to one of two positions in one of which a high intensity image is reflected to the eyes of the driver of the car and in the other of which a low intensity image is similarly reflected. By this means, the driver can quickly adjust the properly positioned rear vision mirror panel to the position dictated by the driving conditions and it is unnecessary for him to carefully adjust the mirror to the relatively critical angularity required for reflection of an image of any particular intensity.

Another object is to provide such a mounting which is free from vibration and also free from loss of proper positioning due to the vibration of the automobile on which it is mounted.

Another object of the invention is to provide such a rear vision mirror which is so designed that when the driver adjusts the angularity of the mirror as a whole to suit his position and height, the mirror is automatically adjusted to its maximum reflectivity. This insures that when the driver thereafter moves the mirror panel to its low intensity position, the desired low intensity image will be properly reflected.

Another object of the invention is to provide such a mirror in which the adjustment from a high to low intensity image reflection, and vice versa, is effected by simply moving the mirror case as a whole so that the attention of the driver is not diverted to any substantial degree in making the adjustment.

Another object of the invention is to provide such a rear vision mirror mounting which is extremely simple and rugged in construction and also low in cost.

Another object of the invention is to provide one form in which the positioning of the mirror panel to reflect the desired view, as well as locking of the mirror panel can be effected positively without interference with the mechanism which permits adjustment of the intensity of image reflection by the mirror panel.

Other objects and advantages of the invention will be apparent from the following description and drawings in which:

Fig. 1 is an elevational view, with parts broken away, of a rear vision mirror embodying the present invention, the mirror being viewed from its reflective side and this being regarded as a front elevational view.

Fig. 2 is a fragmentary, enlarged, vertical section taken generally on line 2—2, Fig. 1.

Fig. 3 is a fragmentary, enlarged, horizontal section taken on line 3—3, Fig. 1.

Fig. 4 is a fragmentary, enlarged, horizontal section taken on line 4—4, Fig. 1.

Fig. 5 is a fragmentary view similar to Fig. 1 and showing a modified form of the invention.

Fig. 6 is a side elevational view of the form of invention shown in Fig. 5.

Fig. 7 is a view similar to Fig. 1 and showing another modified form of the invention.

Fig. 8 is a fragmentary, horizontal sectional view taken on line 8—8, Fig. 7.

Fig. 9 is an enlarged vertical central section through the form of rear vision mirror shown in Fig. 7.

Fig. 10 is a perspective view of a mirror panel supporting plate used in a still further modification of the invention.

Fig. 11 is an enlarged vertical section through this further modification of the invention.

Fig. 12 is a fragmentary horizontal section taken on line 12—12, Fig. 11.

Fig. 13 is a perspective view of the rear ball engaging plate of the form of the invention shown in Figs. 10-12.

Fig. 14 is a perspective view of the front ball engaging plate of the form of the invention shown in Figs. 10-13.

Fig. 15 is a perspective view of the finger piece used in the form of the invention shown in Figs. 10-14.

*Figures 1-4*

The invention is shown as embodied in a mounting for a prismoidal mirror panel which is indicated generally at 20, although it will be understood that the mirror can also be used to support a normal mirror in which case the adjustable support as hereinafter described is merely used to move the mirror panel from an operative to an inoperative position and vice versa. The prismoidal mirror 20 is shown as made of a horizontally elongated plate of glass 21 which is ground so that the vertical axis of its rear planar face 22 is at an angle to the vertical axis of its front planar face 23 but the horizontal axes of these faces are parallel. The mirror 20 is thereby wedge shaped in vertical section and is arranged with its thicker part at its upper end. The glass plate 21 is provided on its rear face with a coating 24 of reflective material, this coating being preferably of a highly reflective metal such as silver in view of the fact that a dulled effect is obtained through using the secondary image reflected by the front face 23 of the glass panel 21. This glass panel 21 is shown as having a straight bottom, rounded ends and a rounded top to proivde a mirror of pleasing shape.

The mirror is encased in a metal backing shell or case 30, the edges 31 of which conform to the edges of the mirror 20 and these edges 31 being flanged or bent around the rim of the mirror panel 20 to provide a bezel, as best indicated in Fig. 2, these bent or crimped edges thereby holding the mirror panel against forward or rearward displacement with reference to its case 30. The silvered mirror panel 20 is also preferably backed by a paper protecting sheet 32.

The rim 31 of the case or shell 30 thereby conforms to the outline of the mirror panel 20, and along its vertical center line but substantially closer to its top than to its bottom the back of this case is provided with a hole 33, the rim of which is rearwardly flanged, as indicated at 34. The shell or case 30 is cup-shaped so as to dish rearwardly from its rim 31 and form a chamber 35 between the mirror plate and the shell, it being an important feature of the invention that the entire mechanism for adjusting the mirror panel 20 to different degrees of reflectivity, as well as to adjust the mirror panel to suit the height and position of the driver is substantially entirely contained within this chamber 35 and hence is substantially entirely concealed. In the form of the invention shown in Figs. 1 through 4 this container is complete, whereas in the form of the invention shown in Figs. 13 through 15 a finger piece can project from the case or shell of the mirror to facilitate the major adjustment of the mirror panel to suit the height and position of the driver.

The stem 36 of a ball 38 also extends through this opening 33, this ball preferably being integral with the stem and disposed within the chamber 35 provided by the metal case or shell 30 and the mirror panel 20. The opposite end of the stem 36 can be secured to the automobile by any suitable mounting (not shown).

The case or shell 30 is preferably made of very light gage sheet metal both to reduce the weight and cost of the rear vision mirror assembly and also to facilitate bending the rim 31 around the rim of the mirror panel 20 to form a bezel for this mirror panel. Within the chamber 35 the light gage sheet metal case or shell 30 is provided with a reinforcing plate 39 of heavier gage sheet metal and which forms the major supporting plate for the mirror panel 20. This mirror panel supporting plate 39 is arranged in face-to-face relation with the inside central surface of the case 30 and being shown as being secured to the case by screws 40, although it will be understood that rivets or weldments could be substituted for these screws. The ball and stem 38, 36 also extend through a central aperture 41 of this mirror panel supporting plate 39, the opening 41 being, of course, in register with the opening 33 in the case or shell 30. This mirror panel supporting plate 39 is provided at the opposite ends of its upper edge with a forwardly arching pair of fingers 42, the curved undersides 43 of these fingers forming fulcrum seats for the mechanism by which adjustment of the mirror panel 20 to different reflective positions is obtained. Below each finger 42 the mirror panel supporting plate 39 is provided with a forwardly projecting finger 47, these fingers having their outboard ends bent upwardly so as to form an upwardly facing recess or seat 44 for a spring member of the mechanism for adjusting the mirror panel 20 to different degrees of reflectivity, as hereinafter described.

Intermediate these bottom fingers 47, the mirror panel supporting plate 39 is centrally provided with a forwardly projecting shelf or tongue 45, this shelf or tongue, as best shown in Fig. 4, being of reduced width at its center, as indicated at 46, so as to provide stops 48 and 49 for limiting the movement of the mirror panel to two positions of reflectivity as hereinafter described.

This mechanism which permits the rear vision mirror assembly both to be frictionally moved to any position around the surface of the ball 38 and which also permits the mirror panel 20 to be swung about the fulcrum seat 43 to different positions of reflectivity is preferably constructed as follows:

The numeral 50 represents a rear ball engaging plate which is housed in the chamber 35 and is provided with an opening 51 which is flanged rearwardly or toward the metal case or shell 30, so as to provide a circular seat 52 engaging the stem side of the ball 38. The opposite ends of the upper edge of this ball engaging back plate 50 provide shoulders which fulcrum in the seats 43 of the mirror panel supporting plate 39, and intermediate these shoulders the plate 50 is provided with an upwardly projecting tongue 53 which prevents horizontal displacement of the mirror panel supporting plate 39 with reference to the plate 50.

The ball engaging plate 50 is also provided with a downwardly projecting pair of fingers 55 which are arranged on opposite sides of the vertical center line of the plate 50 and are spaced from each other a distance slightly greater than the narrow part 46 of the shelf or tongue 45. These fingers 55 embrace this narrow part 46 of the tongue 45 and hence are arranged to come into engagement with the stops 48 and 49 of this tongue as best shown in Fig. 4. Desirable the upper ends of these fingers 55 are offset forwardly from the plane of the plate 50, as indicated at 56, so as to form a seat 58 for the upper end of a spring member of the mechanism as hereinafter described. This upper end of the spring member is retained in engagement with the seat 58 by a finger 59 which projects downwardly from the plate 50 between the fingers 55 and is offset rearwardly from the plane of the plate 50, as best shown in Fig. 2.

The ball seat 52 is held in frictional engagement with the stem side of the ball 38 by a front ball engaging spring plate 60. This spring plate is shown as being of generally rectangular form and as having a central opening 61 the rim of which is flanged forwardly so as to provide a seat 62 for that face of the ball 38 which faces the mirror panel 20. The horizontal ends of the spring plate 60 are preferably adjustably secured to the rear ball engaging plate 50 by screws 63, as best shown in Fig. 3, and from this figure it will be seen that the yielding or spring pressure exerted by the spring plate 60 against the ball 38 can be regulated by the adjustment of these screws 63, the ends of the spring plate 60 being flexed to the degree necessary to provide the desired frictional resistance of the ball engaging plates 50 and 60 against the ball 38.

The mechanism for adjusting the mirror panel 20 to its two reflective positions is completed by a spring which is indicated generally at 65. This spring is in the form of a piece of spring wire which has its central part 66 held against the seats 58 of the rear ball engaging plate 50 by the finger 59 as best shown in Figs. 1 and 2. The ends of the spring are formed into bows or loops 68 to provide lower horizontal portions 69 which oppose each other and which are severally seated in the seats 44 provided by the fingers 47. The action of the spring is to exert upward pressure against the seats 58 and downward pressure against the seats 44 and in its action the spring swings beyond a dead center position, as hereinafter described, to hold the fingers 55 against one or the other of the stops 48 or 49.

Operation—Figs. 1–4

In using the form of the invention shown in Figs. 1–4, the major adjustment is to position the mirror frictionally about the ball 38 so as to reflect the desired view into the eyes of the driver, this adjustment also involving leveling of the mirror so that its lower edge is approximately horizontal. This adjustment essentially depends upon the height and position of the driver and can be effected by swinging the lower edge of the mirror panel 20 and its case 30 toward the rear of the automobile an abnormal extent and then bringing it back so as to swing about a horizontal axis parallel with the mirror panel 20, while at the same time moving the mirror panel and case about a vertical axis. This can be followed by leveling the mirror panel 20 so that its lower edge is horizontal. In doing this, the mirror panel will swing to and from the full and dot-dash line position as shown in Fig. 2 but this adjustment ends up with the mirror being in the full line position shown in Fig. 2 and therefore properly positioned to reflect a high intensity image or view from the rear window of the automobile into the eyes of the driver. This high intensity reflection is from the silver coating 24 of the glass mirror panel 20.

If the driver desires a low intensity reflection, such as would occur at night when it becomes desirable to reduce the apparent intensity of headlights of following cars, the driver merely draws the lower edge of the mirror case 30 toward him. This case 30, together with the mirror panel 20, pivots about the seats 43 and brings the mirror panel and its case to the dot-dash line position shown in Fig. 2. In this adustment the two ball engaging plates 50 and 60 remain stationary because of the relatively firm grip of their seats 52 and 62 upon the opposite sides of the ball 38, the degree of this friction being determined by the screws 63 for the spring plate 60 and being substantially greater than the resistance to the movement of the parts on the seats 43 as an axis. Accordingly when the user draws the lower part of the case 30 toward him the parts pivot about the seats 43 and the lower ends 69 of the spring 65 likewise swing forwardly since the upper part 66 thereof is held stationary against the seats 58 by the finger 59 and these seats and finger being a part of the ball engaging plate 50. The action upon the spring 65 is first one of compressing its free lower ends 69 upwardly until the spring is brought into a common plane with the fulcrum axis against the seats 43. In other words, these lower ends 69 are compressed upwardly until the spring comes into a dead-center position. Thereafter further rear movement of the lower end of the case 30 causes the lower ends 69 of the spring to pass beyond dead center relation with the effective pivot axes of the seats 43 and 58. Accordingly the spring 65 tends to keep the parts in the position shown by the dot-dash lines in Fig. 2 and likewise tends to keep the parts in the full line position shown in this figure, the spring swinging beyond dead center as these two positions are passed.

These two positions are determined by the position of the stops 48, 49, Fig. 4, and by the degree of bend of the fingers 55. These fingers, for this adjustment from one position of reflectivity to another are, of course, stationary and the tongue 45 swings so that the full line position shown in Fig. 2 is determined by engagement of the stops 49 with these fingers 55 (see Fig. 4) and the dot-dash or low reflectivity position shown in Fig. 2 is determined by engagement of the stops 48 with the stationary fingers 55. The distance between the stops 48 and 49 can be accurately provided to accord with the degree of taper to which the glass plate 20 is ground so that no problem in adjustment exists so far as the required amplitude of movement of the mirror plate 20 is concerned. If, however, the mirror should overshoot or undershoot both its high reflectivity and low reflectivity positions, and adjustment can readily be effected by bending the fingers 55 forwardly or backwardly so that when the mirror case is moved rearwardly to the extreme permitted with the movement of the ball engaging friction faces, an image of maximum intensity is reflected from the silver coating 24 and when the lower part of the case 30 is moved forwardly the maximum amount, again without moving any friction faces engaging the ball 38, a low intensity image is reflected from the front or exposed face of the glass mirror panel 20.

Figures 5 and 6

The form of the invention shown in Figs. 5 and 6 is essentially the same as that shown in Figs. 1 through 4. The difference is that instead of the case 30 completely enclosing the rear of the mirror panel 20 and being connected thereto by the continuous endless bezel or rim 31, this case is eliminated in the form of the invention shown in Figs. 5 and 6 and the mirror supporting panel 39a is provided with vertically extending arms at each of its four corners and which extend forwardly and are provided with hooks 31a which serve to secure the mirror panel to the mirror panel supporting plate 39a. The mirror supporting plate 39a has forwardly arching fingers 42a (which correspond to the similar fingers 42 of the form of the invention shown in Figs. 1–4 and which have downwardly facing concavities 43a forming fulcrum seats) struck directly from its upper rim. Similarly the tongue or shelf 45a (which is of the same shape and serves the same function as the tongue 45 shown in Figs. 1–4) is struck forwardly from the lower edge of the mirror supporting panel 39a. Similarly the fingers 47a (which correspond to the fingers 47 of the form of the invention shown in Figs. 1–4 and which have upwardly facing seats 44a) are struck from the mirror supporting plate 39a. Since in other respects the construction of the form of the invention shown in Figs. 5 and 6 is identical with that shown in Figs. 1–4, the same reference numerals have been employed and the description of this construction is not repeated. Also since the operation of the form of the invention shown in Figs. 5 and 6 is identical with the operation of the form shown in Figs. 1–4, the description of this operation is likewise not repeated.

Figures 7–10

The form of the invention shown in Figs. 7–10 is also shown as having a prismoidal mirror 70 provided on its rear face with a reflective coating 74, this prismoidal mirror 70 being identical with the prismoidal mirror 20 except that it is shown as being oblong rather than oval in outline. The mirror panel 70 is held by a case 75 the rim 76 of which conforms to the edges of the mirror plate 70 and these edges 76 being flanged or bent around the rim of the glass pate 70 so as to provide a bezel as best shown in Fig. 9. The shell or case 75 is provided along its vertical center line but closer to its top than to its bottom, with a hole 78, the rim of which is rearwardly flanged as indicated at 79. The rear wall of the shell or case 75 is disposed a substantial distance rearwardly from the mirror panel 70 so as to provide a chamber 80 between the mirror plate and the shell, an important feature again being that at least substantially the entire mechanism for adjusting the mirror panel 70 to different degrees of reflectivity, as well as to adjust the mirror panel to suit the height and position of the driver be substantially entirely contained within this chamber 80. The stem 81 of a ball 82 also extends through this opening 78, this ball preferably being integral with the stem and disposed within the chamber 80 provided by the metal case or shell 75 and the mirror panel 70. The opposite end of the stem 81 can be secured to the automobile by any suitable mounting (not shown).

The case or shell 75 is preferably made of very light gage sheet metal both to reduce the weight and cost of the rear vision mirror and also to facilitate bending the rim 76 around the rim of the mirror panel 70 to form a bezel for this mirror panel. Within the chamber 80 the light gage sheet metal case or shell 75 is provided with a mirror panel supporting plate 84 of heavier gage sheet metals, the central parts of this mirror panel supporting plate 84 and the shell 75 being arranged in face-to-face relation and the rim of the mirror panel supporting plate 84 closely fitting the inside of the rim of the shell or case 75 so that no special fasteners are required to secure these two parts together. The relatively heavy gage sheet metal mirror panel supporting plate 84 is also preferably provided along its upper and lower edges with reinforcing beads 85 and 86 which serve to further increase the strength of the mirror panel supporting plate. The ball and stem 82, 81 also extend through a central aperture 88 of this mirror panel supporting plate 84, the opening 88 being, of course, in register with the opening 78 in the case or shell 75.

The mirror panel supporting plate 84 is provided on opposite sides of its opening 88 with a forwardly arching pair of fingers 89, these fingers being struck from the reinforcing bead 85 and the curved undersides 90 of these fingers forming fulcrum seats for the mechanism by which the adjustment of the mirror panel 70 to different reflective positions is obtained. Below each finger 89 the reinforcing plate is provided with a forwardly projecting finger 91, these fingers having their outboard ends bent upwardly so as to form an upwardly facing recess or seat 92 for a spring member for adjusting the mirror panel 70 to different degrees of reflectivity as hereinafter described.

Intermediate these bottom fingers 91, the reinforcing plate 84 is centrally provided with a forwardly projecting shelf or tongue 93, this tongue, as best shown in Fig. 10, being of reduced width at its inboard end, as indicated at 94, so as to provide stops 95 and 96 for limiting the movement of the mirror panel to two positions of reflectivity as hereinafter described.

The mechanism which permits both the rear vision mirror assembly to be frictionally held at any position around the surface of the ball 82 and which also permits the mirror panel 70 to be swung about the fulcrum seats 90 to different positions of reflectivity is preferably constructed as follows:

The numeral 100 represents a rear ball engaging plate which is housed in the chamber 80 and provided with an opening 101 which is flanged rearwardly or toward the metal case or shell 75 to provide a seat 102 engaging the stem side of the ball 82. The opposite ends of the upper edge of this ball engaging back plate 100 provide shoulders which fulcrum in the seats 90 of the mirror panel supporting plate 84, and horizontal displacement of the plate 84 with reference to the plate 100 is prevented by a pair of ears 103 struck from the reinforcing plate 84 to embrace the vertical edges of the plate 100 as best shown in Figs. 7 and 8.

The plate 100 is also provided with a downwardly projecting pair of fingers 105 which are arranged in front of the vertical center line of the plate 100 and are spaced from each other a distance slightly greater than the narrow part 94 of the tongue 93. These fingers 105 embrace this narrow part 94 of the tongue 93 and hence are arranged to come into engagement with the stops 95 and 96 at the opposite ends of this tongue. These fingers 105 also form seats 108 for the upper end of a spring member of the mechanism as hereinafter described. This upper end of the spring member is retained in engagement with the seats 108 by a finger 109 which projects downwardly from the plate 100 between the fingers 105 and is offset rearwardly from the plane of the plate 100 as best shown in Fig. 9.

The ball seat 102 is held in frictional engagement with the stem side of the ball 82 by a front ball engaging spring plate 110. This spring plate is shown as being of generally rectacular form and as having a central opening 111 the rim of which is offset to provide a seat 112 for that face of the ball 82 which faces the mirror panel 70. The horizontal ends of the spring plate 110 are preferably adjustably secured to the rear ball engaging plate 100 by screws 113, as best shown in Fig. 8, and from this figure it will be seen that the yielding or spring pressure exerted by the spring plate 110 against the ball 82 can be regulated by adjustment of these screws 113, the ends of the spring plate being flexed to the degree necessary to provide the desired frictional resistance of the ball engaging plates 100 and 110 against the ball 82.

The mechanism for adjusting the mirror panel 70 to its two reflective positions is completed by a toggle member in the form of a spring which is indicated generally at 115. The toggle member is in the form of a piece of spring wire which has its central part 116 held against the seats 108 of the rear ball engaging plate 100 by the finger 109 as best shown in Fig. 9. The ends of the spring are formed into bows or loops 118 to provide lower horizontal portions 119 which oppose each other and which are severally seated in the seats 92 provided by the fingers 91. The action of the spring toggle is to exert upward pressure against the seats 108 and downward pressure against the seats 92 and in this action the spring swings beyond a dead center position, as hereinafter described, to hold the fingers 105 against one or the other of the stops 95 or 96.

*Operation—Figs. 7–10*

In using the form of the invention shown in Figs. 7–10, the major adjustment is to position the mirror assembly frictionally about the ball 82 so as to reflect the desired view into the eyes of the driver, this adjustment also involving leveling of the mirror so that it is approximately horizontal. This adjustment essentially depends upon the height and position of the driver and can be effected by swinging the lower edge of the mirror panel 70 and its case 75 toward the rear of the automobile an abnormal extent and then bringing it back so as to swing about a horizontal axis parallel with the mirror panel 70 while at the same time moving the mirror panel and case about a vertical axis. This can be followed by leveling the mirror panel 70 until its lower edge is horizontal. In doing this, the mirror panel will swing to and from its positions of maximum and less reflectivity but this adjustment ends up with the mirror being in the full line position shown in Fig. 9 and therefore properly positioned to reflect a high intensity image or view from the rear window of the automobile into the eyes of the driver. This high intensity reflection is from the silver coating 74 of the glass mirror panel 70.

When the driver desires a reflection of reduced intensity, all that is required is to swing the lower edge of the case 75 toward him without disturbing the frictional setting of the rear vision mirror assembly upon the ball 82. In this movement, the mirror panel supporting plate 84 fulcrums with its seat 90 about the upper edge of the rear ball engaging plate 100. With the parts in the full line position shown in Fig. 9, the depending finger 109 is in engagement with the stop 97 which is formed by the surface of the mirror panel supporting plate 84 immediately above the tongue 93. This stop 97 thereby determines the high reflectivity position of the mirror panel. When the driver swings the lower edge of the case 75 toward him, the finger 109 leaves the stop 97 and the fingers 105 engage the stops 96 at the outboard end of the tongue 93. When these stops 95 are engaged the mirror panel 70 is in a position of diminished reflectivity.

In this movement of the mirror panel 70, case 75 and its mirror panel supporting plate 84 about the fulcrum axis provided by the seats 90, the ends 119 of the toggle or spring 115 are compressed upwardly and also pass through dead center relation with the pivot axes of the upper part 116 of the spring and the fulcrum seat 90. By so passing through a dead center relation in adjusting the mirror panel from one position of reflectivity to another, this spring 115 tends to hold the mirror panel in one or the other of these positions and hence avoids the mirror panel slipping out of properly adjusted position.

*Figures 11–15*

The form of the invention shown in Figs. 11–15 is characterized particularly by the ability to be able to adjust the rear vision mirror assembly frictionally about its ball without affecting the adjustment of the mirror from one intensity to another, and conversely, and as with the other forms of the invention, being able to effect the adjustment of the mirror from one intensity to the other without disturbing the adjustment of the assembly as a whole about this supporting ball. The form of the invention shown in Figs. 11–15 also embodies the features and advantages of the other forms of the invention shown.

The Fig. 11–15 form of the invention is shown as having a prismoidal mirror indicated generally at 120 and which is shown as made of a horizontally elongated plate of glass 121 which is ground so as to be wedge shaped in vertical section with its front and rear planar faces converging downwardly toward a common line. The glass plate 121 is provided on its rear face with a reflective coating, this coating being preferably of a highly reflective metal such as silver 122.

The mirror is held by a supporting member which includes a metal shell or case 125, the edges 126 of which conform to the edges of the mirror 120 and these edges 126 being flanged or bent around the rim of the mirror 120 to provide a bezel, as best indicated in Fig. 11, these bent or crimped edges thereby holding the mirror against forward or rearward displacement with reference to the supporting case 125. The mirror 120 is also preferably backed by a paper protecting sheet 127.

The rim 126 of the case or shell 125 thereby conforms to the outline of the mirror panel 120, and along its vertical center line, but substantially closer to its top than to its bottom, the back of this case is provided with a hole 128, the rim of which is rearwardly flanged, as indicated at 129. The shell or case 125 is cup-shaped so as to dish rearwardly from its rim 126 and form a chamber 130 between the mirror plate 120 and the shell 125, it again being an important feature that substantially the entire mechanism for adjusting the mirror panel 120 to different degrees of reflectivity as well as substantially the entire mechanism for adjusting the mirror panel to suit the height and position of the driver be contained within this chamber 130 and hence substantially entirely concealed. It will also particularly be noted that the case 125 is provided centrally with a large downwardly directed opening 127a.

The stem 131 of a ball 132 also extends through this opening 128, this ball preferably being integral with the stem and disposed within the chamber 130 provided by the metal case or shell 125 and the mirror panel 120. The opposite end of the stem 131 can be secured to the automobile by any suitable mounting (not shown).

The case or shell 125 is preferably made of very light gage sheet metal both to reduce the weight and cost of the rear vision mirror assembly and also to facilitate bending the rim 126 around the rim of the mirror panel 120 to form a bezel for this mirror panel. Within the chamber 130 is arranged a mirror panel supporting plate 133 of a heavier gage sheet metal, this mirror panel supporting plate being arranged for the major portion of its area in face-to-face relation with the inside surface of the shell or case 125. This mirror panel supporting plate is shown as having a rim 134 which is embraced by the bezel or rim 126 of the case 125 and is interposed between this rim 126 of the shell or case 125 and the rim of the mirror panel 120. This mirror panel supporting plate 133 is also shown as having a portion 135 of its lower central area struck forwardly to provide a horizontal shelf 136 arranged within the chamber 130. This shelf has a rectangular hole 137, the opposite edges of which form limit stops 138 and 139 as hereinafter described. As with the other forms of the invention, the mirror panel supporting plate 133 is provided with a hole 140 in register with the hole 128 and above and opposite sides of this hole 140 a pair of horizontally spaced fingers 141 are struck forwardly from the body of the mirror panel supporting plate 133, that is, toward the mirror panel 120. These fingers are preferably of arching form to provide pivot or fulcrum seats 142 as hereinafter described. Below and on opposite sides of the hole 140, the mirror panel supporting plate 133 has a pair of fingers 143 struck forwardly therefrom, that is, toward the mirror panel 120. These fingers 143 curve upwardly to provide upwardly facing pivot seats 144.

The mechanism which permits the rear vision mirror assembly both to be frictionally moved to any position around the surface of the ball 132 and which also permits the mirror panel 120 to be swung about the fulcrum seats 142 to different positions of reflectivity is preferably constructed as follows:

The numeral 145 represents the rear ball engaging plate which is housed within the chamber 130 and is provided with an opening 146 which is flanged rearwardly so as to provide a seat 148 engaging the stem side of the ball 132. The opposite ends of this ball engaging back plate 145 provide shoulders 149 which fulcrum in the seats 142 of the mirror panel supporting plate 133 and intermediate these shoulders the plate 145 is provided with a flange 150 which prevents horizontal displacement of the mirror panel supporting plate 133 with reference to the plate 145.

The plate 145 is also provided with a downwardly projecting pair of fingers 151 which are arranged on opposite sides of the vertical center line of the plate 145 and are spaced from each other and flank a central finger 152 which also projects downwardly from the lower edge of the plate 145. The pair of fingers 151 are of curving form and are bent, with reference to the plane of the plate 145, toward the back of the shell or case 125 whereas the central finger 152 is curved and is bent, with reference to the plane of the plate 145, toward the mirror panel 120. This last finger 152 projects through the rectangular opening 137 and therefore is positioned to engage one or the other of the stops 138, 139 provided by this rectangular opening.

The fingers 151, 152 jointly embrace the upper part 153 of a toggle member in the form of a spring wire 154. As with the other forms of the invention shown, the opposite horizontal ends of this toggle or spring wire are bowed or curved, as indicated at 155, and terminate in opposing ends 156 which rest in the seats 144 provided by the fingers 143 struck forwardly from the bottom part of the reinforcing plate 133, as previously described.

The ball seat 148 is held in frictional engagement with the stem side of the ball 132 by a front ball engaging spring plate 160. This spring plate is shown as being of generally rectangular form and as having a central opening 161 the rim of which is flanged so as to provide a seat 162 for that face of the ball 132 which faces the mirror panel 120. The ends of the spring plate 161 are also provided with apertured ears 163 which are adjustably secured to the rear ball engaging plate 145 by screws 164, the yielding or spring pressure exerted by the plates 145, 160 against the ball 132 being regulated by the adjustment of these screws 164 the ends of the screw plate 160 being flexed to the degree necessary to provide the desired frictional resistance of the ball engaging plates 145 and 160 against the ball 132.

The ball engaging plate 160 is also provided along its opposite vertical edges with a pair of reversely formed flanges 165, each of these flanges extending from the edge of the plate 160 toward the mirror panel 120 and thence toward its companion flange 165 so as to provide a guideway 166 which guideways oppose each other. These guideways receive the upwardly extending spaced tongues 168 of a finger bar 169, the lower part of this finger bar being arranged adjacent the lower edge of the bezel 126 and preferably having a forwardly extending flange 170 which is in closely spaced relation to the bezel 126, as best shown in Fig. 11. The finger piece 169 is arranged in the bottom opening 127a of the shell or case 125 and the tongues 168 extend up through the openings 171 provided in the shelf 136 for the fingers 151. In order to hold the finger piece 169 in operative position, its tongues 168 are shown as each provided with a laterally offset portion 172 which offset portions are arranged to be forced past the central part 153 of the spring 154 when the finger piece is forced upwardly from the dot-dash line position shown in Fig. 11 into the guideways 166. The offset portions 172 rest upon this upper part 153 of the spring 154 and prevent the finger piece from falling.

*Operation—Figs. 11–15*

In using the form of the invention shown in Figs. 11-15, the major adjustment of positioning the mirror assembly frictionally about the ball 132 so as to reflect the desired view into the eyes of the driver and also to level the mirror is effected by holding the finger piece 169 against the back of the mirror panel 120. This is done by placing one's finger against the lower part of the bezel 126 and inserting another finger through the hole 127 and drawing it against the back of the finger piece 169. This serves to hold this finger piece 169 against the bezel 126 and hence compels the mirror panel 120 to move in unison with the ball engaging plates 145 and 160. So held, the mirror assembly is therefore rotated frictionally about the ball 132 and can be adjusted about its vertical axis or any horizontal axis to properly position the mirror panel to reflect the desired view and also to level the mirror panel. In this position of the parts, that is with the finger piece 169 against the bezel 126, the mirror panel 120 is in its position of high intensity reflection as shown by full lines in Fig. 11.

When the driver desires a reflection of reduced intensity, he merely grips the lower part of the bezel 126 independently of the finger piece 169 and draws it forwardly so as to position the mirror panel 120 in the dot-dash position shown in Fig. 11. This movement of the mirror panel does not affect the frictional adjustment of the assembly upon the ball 132 because of the preponderating frictional resistance of the plates 145 and 160 against the ball 132.

In this movement of the mirror panel 120 from the full to the dot-dash line position shown in Fig. 11, the mirror panel supporting plate 133 fulcrums with its pivot seat 142 about the shoulders 149 of the rear ball engaging plate 145. With parts in the full line position shown in Fig. 9, the depending finger 152 is in engagement with the stop 139 (Fig. 12) and which stop is formed by one side of the square hole 137 in the shelf 136 of the mirror panel supporting plate 133. The stop 139 thereby determines the high reflectivity position of the mirror panel.

When the driver swings the lower part of the mirror panel 120, together with its case 125, toward him, the finger 152 leaves the stop 139 and engages the stop 138 at the other side of the opening 137. When the stop 138 is engaged, the mirror panel 120 is in the position of reduced intensity shown by dot-dash lines in Fig. 11.

In this movement of the mirror panel 120, case 125 and its mirror panel supporting plate 133 about the fulcrum axis provided by the seats 142, the ends 156 of the toggle member or spring 154 are compressed upwardly and also pass through dead center relation with the pivot axis of the upper part 153 of the spring and the fulcrum seat 142. By so passing through dead center relation and adjusting the mirror panel from one position of reflectivity to another, this toggle or spring 154 tends to hold the mirror panel in one or the other of these positions and hence avoids the mirror panel slipping out of a properly adjusted position.

From the foregoing, it will be seen that all forms of the present invention provide a rear vision mirror panel carried by and in fixed relation to a mirror panel supporting plate with a space provided between the mirror panel and its supporting plate and with the major adjusting mechanism for the mirror panel frictionally about a ball, as well as the secondary adjusting mechanism of the mirror panel to different positions of reflectivity, both substantially housed within this space. It will further be seen that the various forms of the invention achieve the objects enumerated.

I claim:

1. A rear vision mirror comprising a supporting stem having a ball fixed to one end thereof, a first ball engaging plate having a hole surrounded by a seat engaging the stem side of said ball, a second ball engaging plate having a seat engaging the side of said ball opposite its stem, means securing said ball engaging plates together in compressive relation to said ball, a mirror supporting panel plate having an opening in register with the opening of said first ball engaging plate and surrounding the stem side of said ball, a pivotal connection between said mirror panel supporting plate and said first ball engaging plate, the axis of said pivotal connection being generally horizontal and generally parallel with said mirror panel supporting plate, a seat provided on said first ball engaging plate remote from said axis, a seat provided on said mirror panel supporting plate in spaced opposing relation to said last seat and one of said last two seats being in spaced opposing relation to said axis, a toggle member having opposite parts pivoted in said last two seats and swingable through a dead center relation to said axis as said mirror supporting panel is swung about said axis, a reflective mirror panel, means fixing the margin of said mirror panel to the margin of said mirror panel supporting plate, and a finger piece fast to one of said ball engaging plates and projecting vertically therefrom in close proximity to the corresponding edge of said reflective mirror panel in one extreme position of the latter about said axis, whereby upon seizing said finger piece and said means fixing the margin of said reflective mirror panel to the margin of said mirror panel supporting plate said reflective mirror panel and ball engaging plates can be adjusted about said ball without disturbing the adjustment of said reflective mirror panel about said axis with reference to said ball engaging plates.

2. A rear vision mirror as set forth in claim 1 wherein said first ball engaging plate is formed to provide a pair of opposed vertical guideways and wherein said finger piece has a pair of upstanding tongues fitted in said guideways.

3. A rear vision mirror as set forth in claim 1 wherein said means fixing the margin of said mirror panel to the margin of said mirror panel supporting plate comprises a sheet metal case arranged in face-to-face relation on the side of said mirror panel supporting plate from which said stem projects and has its rim embracing and forming a bezel for said mirror panel, said case being provided with an access opening through which said finger piece extends.

4. A rear vision mirror comprising a supporting stem having a ball fixed to one end thereof, a first ball engaging plate having a hole surrounded by a seat engaging the stem side of said ball, a second ball engaging plate having a seat engaging the side of said ball opposite its stem, means securing said ball engaging plates together in compressive relation to said ball, a mirror supporting panel plate having an opening in register with the opening of said first ball engaging plate and surrounding the stem side of said ball, a pair of upwardly facing shoulders provided at the opposite ends of one of said ball engaging plates, a pair of spaced fingers projecting horizontally from said mirror panel supporting plate toward said reflective mirror panel and having downwardly facing seats engaging said shoulders to provide a pivotal connection the axis of which is generally horizontal and generally parallel with said mirror panel supporting plate, a downwardly facing seat provided on said first ball engaging seat below said axis, an upwardly facing seat provided on the lower part of said mirror panel supporting plate in spaced opposing relation to said last seat, a spring toggle member having opposite parts pivoted in said last two seats and swingable through a dead center relation to said axis as said mirror panel is swung about said axis, a reflective mirror panel, and a sheet metal case secured in face-to-face relation on the side of said mirror panel supporting plate from which said stem projects and having its rim embracing and forming a bezel for said mirror panel.

References Cited in the file of this patent

UNITED STATES PATENTS

| | | | |
|---|---|---|---|
| 2,420,259 | McNamara | May 6, | 1947 |
| 2,469,207 | Roedding | May 3, | 1949 |
| 2,502,699 | Budreck | Apr. 4, | 1950 |
| 2,613,575 | Falge | Oct. 14, | 1952 |
| 2,640,394 | Bertell | June 2, | 1953 |
| 2,661,177 | Hofer | Dec. 1, | 1953 |
| 2,722,159 | Budreck | Nov. 1, | 1955 |